Dec. 7, 1926.
F. T. FILLION
EYEGLASS ATTACHMENT
Filed June 24, 1926
1,610,043
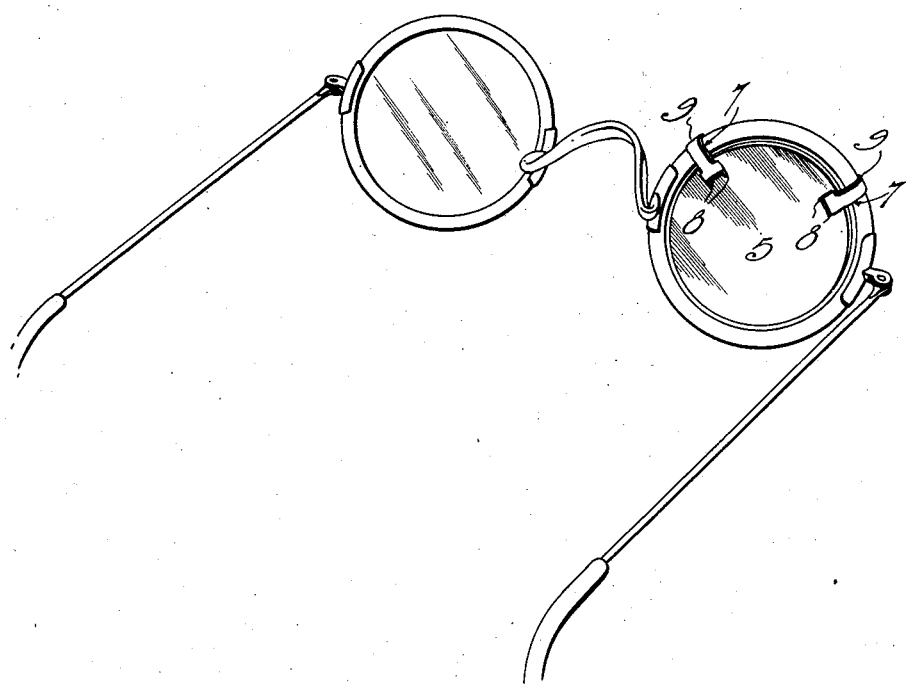
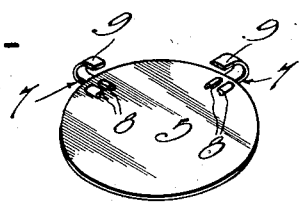
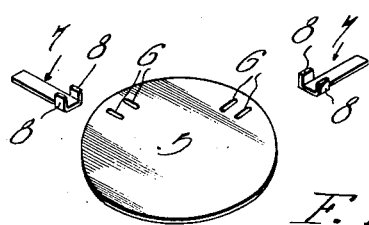
Witness
H. Woodard
Inventor
F. T. Fillion
By H. B. Wilson & Co.
Attorneys Patented Dec. 7, 1926.

1,610,043

UNITED STATES PATENT OFFICE.

FREDERICK T. FILLION, OF NORTH PLATTE, NEBRASKA.

EYEGLASS ATTACHMENT.

Application filed June 24, 1926. Serial No. 118,265.

The present disclosure of the invention is directed to an anti-glare attachment for eyeglasses of any type, and such invention includes a disk for disposition at one side of an eyeglass lens, and while this disk is formed of translucent material when it is to be used to protect the eye against glare from headlights or from the sun, I wish it understood that in some instances, said disk could have other characteristics. For instance, it could well constitute an auxiliary lens for co-action with the ordinary lens of the glasses, so that the latter may be quickly and easily converted either for short or long vision.

It is the object of the invention to provide a device of the class set forth which is of extreme simplicity, may be therefore inexpensively manufactured and sold at small cost, and may be quickly and easily applied to or removed from the eyeglasses, the device being of such size that it may readily be carried in the user's vest pocket or in some other space equally small, when its use is not needed.

With the foregoing in view, the invention resides in the novel subject matter hereinafter described and claimed, the description being supplemented by the accompanying drawing.

Figure 1 is a perspective view of a pair of spectacles showing one of the attachments applied thereto.

Figure 2 is a perspective view of the attachment removed from the spectacles.

Figure 3 is a disassembled perspective view illustrating the manner of constructing the attachment.

In the drawing above briefly described, illustrating the preferred form of construction, the numeral 5 designates a disk having any desired characteristics, according to the function which it is to carry out. Near its edge, this disk is formed with two pairs of parallel, substantially radial slots 6. Two T-shaped pieces of metal 7 are disposed at one side of the disk 5, and have the ends 8 of their heads, bent laterally, passed through the slots 6 and clinched, so as to effectively unite the pieces of metal with the disk 5. The shanks of these metal pieces are bent to provide supporting hooks 9.

In applying the device, the disk 5 is disposed at one side of an eyeglass lens, preferably the inner side, and hooks 9 are engaged either with the edge of the lens or with a holding rim for said edge, according to the design of the eyeglasses. The device may be used in connection with one or both lenses, as occasion may demand.

It is customary for the drivers of automobiles, to carry a pair of anti-glare spectacles for use in bright sunlight or for night driving to protect their eyes against glare, and hence, drivers who must wear eyeglasses to correct defective vision, very often must have the two pairs of glasses on hand at all times. By the use of my invention however, this is unnecessary, as two of the disks 5, formed of appropriate translucent material, may be readily carried in the vest pocket or in some other convenient place, and may be applied with ease to the ordinary eyeglasses whenever their use is advisable. It will also be understood that if the disks 5 are properly ground, they may be made to change the effect of the eyeglass lenses with which they are used, so that a single pair of eyeglasses may be quickly and easily converted either for reading or other close observation, or for long distance vision.

As excellent results are obtainable from the details disclosed, they are preferably followed. However, within the scope of the invention as claimed, variations may be made.

I claim:—

An eyeglass attachment comprising a disk for disposition at one side of an eyeglass lens, said disk having a pair of parallel substantially radial slots near its edge, and a T-shaped piece of sheet metal disposed at one side of said disk and having the ends of its head portion bent laterally, passed through said slots and clinched, the shank of said piece of metal being bent to provide a supporting hook to hook around the lens edge or a holding rim for such edge.

In testimony whereof I have hereunto affixed my signature.

FREDERICK T. FILLION.